United States Patent
Jung

(10) Patent No.: US 11,527,928 B2
(45) Date of Patent: Dec. 13, 2022

(54) STATOR OF MOTOR FOR AUTOMOBILE

(71) Applicant: HYUNDAI MOBIS, Co., Ltd., Seoul (KR)

(72) Inventor: Jin Ho Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 171 days.

(21) Appl. No.: 17/131,659

(22) Filed: Dec. 22, 2020

(65) Prior Publication Data

US 2021/0359557 A1     Nov. 18, 2021

(30) Foreign Application Priority Data

May 18, 2020     (KR) .................. 10-2020-0059385

(51) Int. Cl.
| | |
|---|---|
| H02K 1/12 | (2006.01) |
| H02K 3/46 | (2006.01) |
| H02K 3/28 | (2006.01) |

(52) U.S. Cl.
CPC ................. *H02K 1/12* (2013.01); *H02K 3/28* (2013.01); *H02K 3/46* (2013.01); *H02K 2203/09* (2013.01); *H02K 2203/12* (2013.01)

(58) Field of Classification Search
CPC .............................. H02K 2203/09; H02K 3/28
See application file for complete search history.

(56) References Cited

U.S. PATENT DOCUMENTS

| | | | |
|---|---|---|---|
| 8,193,677 B2 | 6/2012 | Murakami et al. | |
| 8,232,696 B2 * | 7/2012 | Shinkawa | H02K 3/522 |
| | | | 310/71 |
| 10,396,607 B2 * | 8/2019 | Adachi | H02K 1/185 |
| 10,742,003 B2 * | 8/2020 | Takahashi | H02K 21/14 |
| 11,038,397 B2 * | 6/2021 | Kim | H02K 3/28 |
| 11,056,946 B2 * | 7/2021 | Takahashi | H02K 3/522 |
| 11,075,558 B2 * | 7/2021 | Yamashita | H02K 1/16 |
| 11,277,047 B2 * | 3/2022 | Murakami | H02K 3/38 |
| 2013/0328425 A1 * | 12/2013 | Tomita | H02K 3/52 |
| | | | 310/71 |
| 2015/0061431 A1 * | 3/2015 | Egami | H02K 3/522 |
| | | | 310/71 |
| 2020/0059126 A1 * | 2/2020 | Takahashi | H02K 3/522 |
| 2021/0359557 A1 * | 11/2021 | Jung | H02K 3/46 |
| 2022/0224183 A1 * | 7/2022 | Lee | H02K 1/148 |

FOREIGN PATENT DOCUMENTS

| | | |
|---|---|---|
| JP | 2008-278691 | 11/2008 |
| JP | 2009-056867 | 3/2009 |

* cited by examiner

*Primary Examiner* — Robert W Horn

(74) *Attorney, Agent, or Firm* — H.C. Park & Associates, PLC

(57) ABSTRACT

A stator of a motor for an automobile includes a plurality of assemblies disposed in a curve shape to form a hole at a center of the stator. Each of the plurality of assemblies includes: a stator core; a bobbin surrounding an outer surface of the stator core; a coil being wound multiple times around the bobbin and connected to a lead-in line and a lead-out line disposed at both ends thereof, respectively; and a plurality of bus bars disposed on the bobbin. At least one of the plurality of bus bars is connected to the lead-in line or the lead-out line. Some of the plurality of bus bars intersect each other.

17 Claims, 7 Drawing Sheets

STATOR OF MOTOR FOR AUTOMOBILE

CROSS-REFERENCE TO RELATED APPLICATION

This application claims priority from and the benefit of Korean Patent Application No. 10-2020-0059385, filed on May 18, 2020, which is hereby incorporated by reference for all purposes as if set forth herein.

BACKGROUND

Field

Exemplary embodiments relate to a stator of a motor for an automobile and more specifically, to a stator of a motor for an automobile with a small size and a low cost.

Discussion of the Background

In order to overcome environmental pollution from existing fossil-fuel internal-combustion engine automobiles and unstable supply and demand thereof according to domestic and overseas circumstances, hybrid automobiles, electric automobiles, and the like have been actively developed and produced.

Such an electric automobile and a hybrid automobile are provided with an electric driving motor which is used for driving of the automobile. Such a motor has a structure in which a coil is wound around a stator core, and an injection-molded component, made of plastic and referred to as a bobbin, is used in the motor to prevent the coil from being damaged by the stator core. According to the related art, a motor has a structure in which a stator core and a bobbin are assembled, and a coil is wound around the bobbin.

Here, the motor has a structure in which a plurality of assemblies including stator cores, bobbins, and coils are coupled to each other. Particularly, in order for a plurality of assemblies constituting a driving motor for an automobile to receive power from a power supply unit, the plurality of assemblies and the power supply unit are connected to each other by a terminal.

However, according to the related art, weight and production costs of the driving motor for an automobile increase due to the volume occupied by such a terminal. Also, it is difficult to utilize a space around the terminal, and a structure of the driving motor becomes complex.

The above information disclosed in this Background section is only for enhancement of understanding of the background of the invention and, therefore, it may contain information that does not constitute prior art.

SUMMARY

Exemplary embodiments are to reduce weight and production costs of a driving motor of an automobile by removing an existing terminal, increase space utilization around the motor, and simplify a structure of the motor.

According to an aspect of the invention, a stator of a motor for an automobile includes a plurality of assemblies disposed in a round shape to form a hole at a center of the stator, wherein each of the plurality of assemblies includes: a stator core; a bobbin surrounding an outer surface of the stator core; a coil being wound multiple times around the bobbin and connected to a lead-in line and a lead-out line disposed at both ends of the coil, respectively; and a plurality of bus bars disposed on the bobbin, wherein: at least one of the plurality of the bus bars is connected to the lead-in line or the lead-out line, and some of the plurality of bus bars intersect each other.

The plurality of bus bars may include a first bus bar, a second bus bar, and a third bus bar, and the first bus bar may intersect the second bus bar and the third bus bar.

The lead-in line may be bonded to the first bus bar.

The second bus bar and the third bus bar may be disposed to parallel each other.

The plurality of assemblies may be divided into one or more first assemblies, one or more second assemblies, and one or more third assemblies, and each of the first assemblies, each of the second assemblies, and each of the third assemblies may be alternately disposed in the curve shape. One end of the first bus bar of each first assembly may be connected to one end of the third bus bar of each second assembly, and the other end of the first bus bar of each first assembly may be connected to one end of the second bus bar of each third assembly. One end of the second bus bar of each first assembly may be connected to one end of the first bus bar of each second assembly, and the other end of the second bus bar of each first assembly may be connected to one end of the third bus bar of each third assembly. One end of the third bus bar of the first assembly may be connected to one end of the second bus bar of each second assembly, and the other end of the third bus bar of each first assembly may be connected to one end of the first bus bar of each third assembly.

The one end of the first bus bar of each second assembly may be connected to one end of the third bus bar of each third assembly, the one end of the second bus bar of each second assembly may be connected to one end of the first bus bar of each third assembly, and the one end of the third bus bar of each second assembly may be connected to one end of each second bus bar of each third assembly.

The stator may receive power from a power supply unit configured to supply three-phase power of U-phase power, V-phase power, and W-phase power, wherein each first assembly receives the U-phase power from the power supply unit via the lead-in line of each first assembly, each second assembly receives the V-phase power from the power supply unit via the lead-in line of each second assembly, and each third assembly receives the W-phase power from the power supply unit via the lead-in line of each third assembly.

The plurality of bus bars may further include a fourth bus bar, and the lead-out line may be bonded to the fourth bus bar.

The first, second, and third assemblies may be connected to a neutral line via the lead-out lines of the first, second, and third assemblies.

A direction, in which the first, second, and third bus bars are disposed, may parallel a direction in which the bobbin extends.

A direction, in which the first, second, and third bus bars are disposed, may be perpendicular to a direction in which the bobbin extends.

The first, second, third, and fourth bus bars may be disposed on an outer surface of the bobbin.

The first, second, and third bus bars may be disposed on an outer surface of the bobbin, and the fourth bus bar may be disposed on an inner surface of the bobbin opposite to the outer surface of the bobbin.

One end of the fourth bus bar of each first assembly may be connected to one end of the fourth bus bar of each second assembly, and the other end of the fourth bus bar of each first assembly may be connected to one end of the fourth bus bar of each third assembly, wherein the one end of the fourth bus bar of each second assembly is connected to the one end of the fourth bus bar of each third assembly.

The first bus bar may include a hook portion having a hook shape protruding outwardly and bent inwardly, and the lead-in line may be bonded to an inner surface of the hook portion of the first bus bar.

The fourth bus bar may include a hook portion having a hook shape protruding outwardly and bent inwardly, and the lead-out line may be bonded to an inner surface of the hook portion of the fourth bus bar.

Each first assembly, each second assembly, and each third assembly may have identity or similarity so as to be compatible with each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
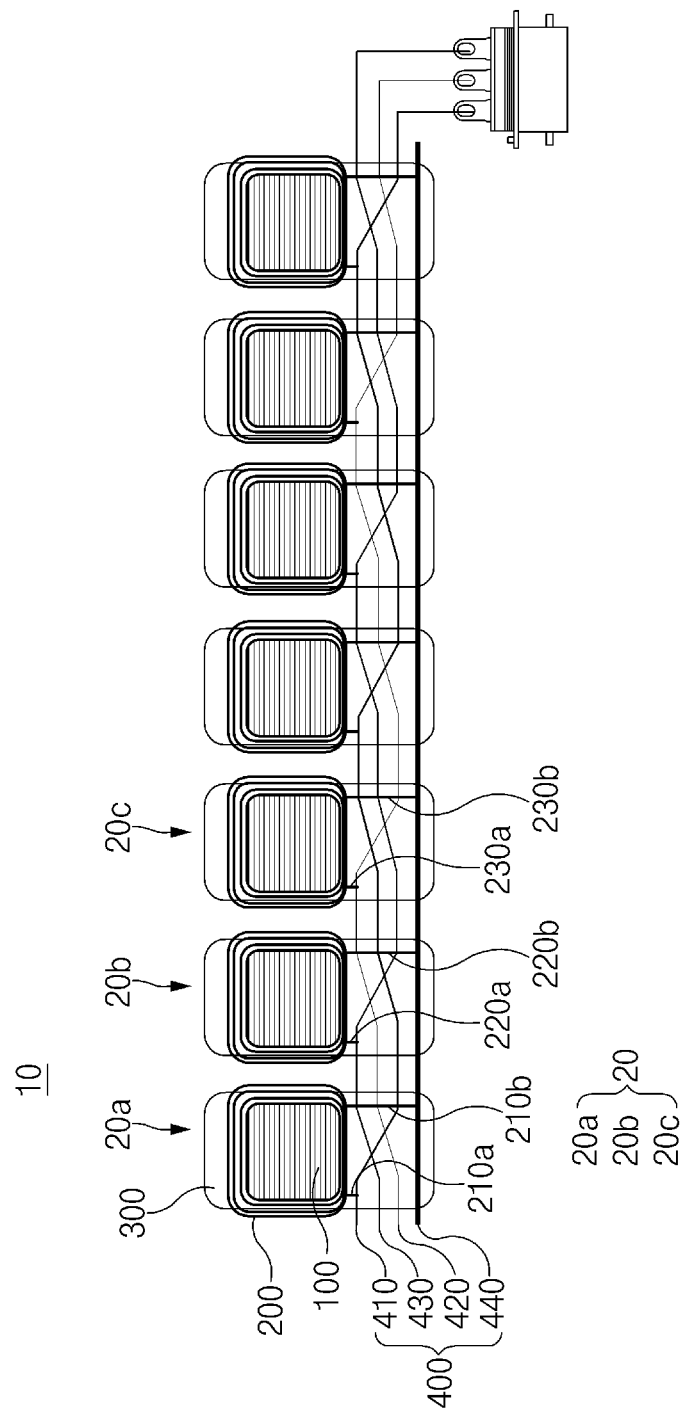
FIG. 1 is a side view schematically illustrating a connection structure of a plurality of assemblies that constitute a stator of a motor for an automobile according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Various advantages and features of the present invention and methods accomplishing thereof will become apparent from the following description of embodiments with reference to the accompanying drawings. However, the present invention is not limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, a motor for an automobile, and a stator of a motor for an automobile according to the present disclosure will be described with reference to the drawings.

Motor for Automobile, and Stator of Motor for Automobile

Figure 2:
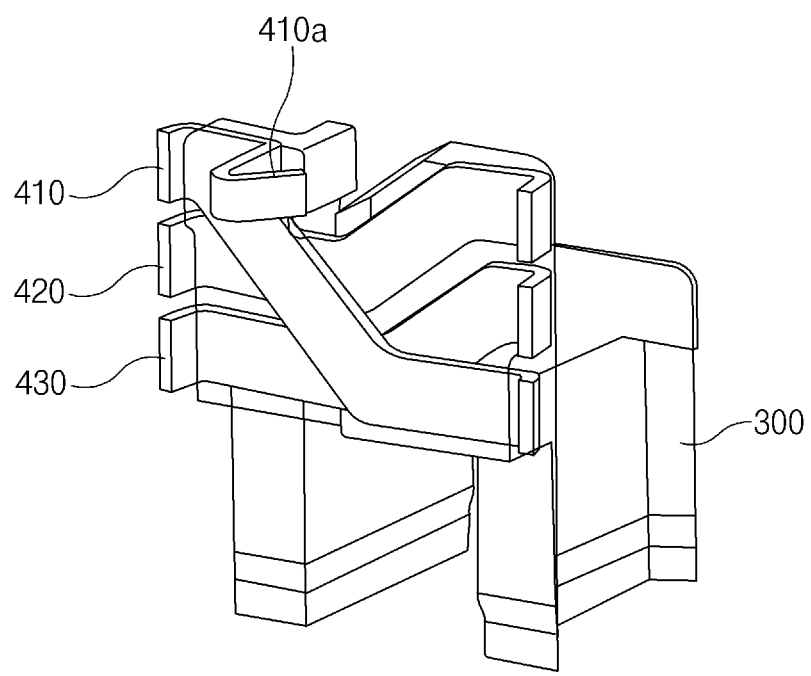
FIG. 2 is a perspective view illustrating an example of a state in which first, second, and third bus bars are mounted to a bobbin in an assembly that constitutes a stator of a motor for an automobile according to an exemplary embodiment.
Figure 3:
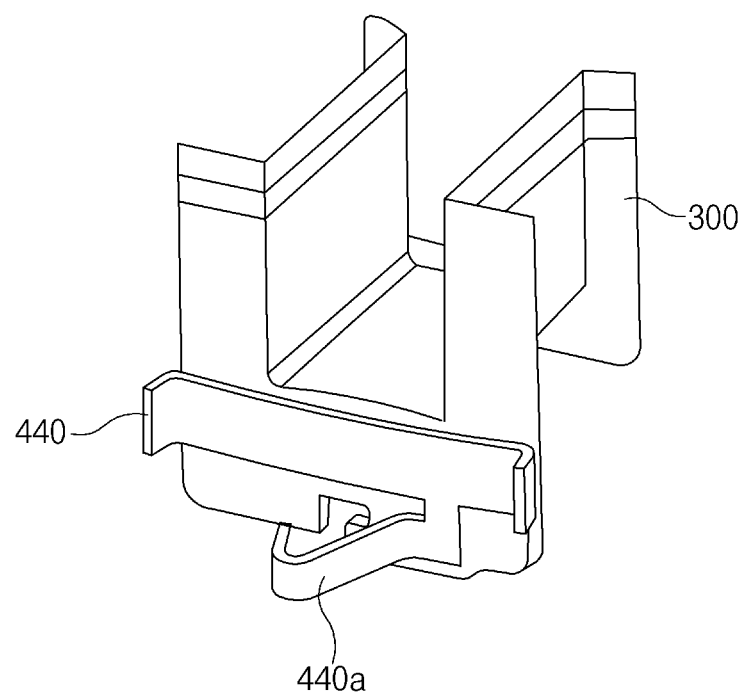
FIG. 3 is a perspective view illustrating an example of a state in which a fourth bus bars is mounted to a bobbin in an assembly that constitutes a stator of a motor for an automobile according to an exemplary embodiment.

FIG. 1 is a side view schematically illustrating a connection structure of a plurality of assemblies that constitute a stator of a motor for an automobile according to an exemplary embodiment, and FIG. 2 is a perspective view illustrating an example of a state in which first, second, and third bus bars are mounted to a bobbin in an assembly that constitutes a stator of a motor for an automobile according to an exemplary embodiment. FIG. 3 is a perspective view illustrating an example of a state in which a fourth bus bars is mounted to a bobbin in an assembly that constitutes a stator of a motor for an automobile according to an exemplary embodiment.

Figure 4:
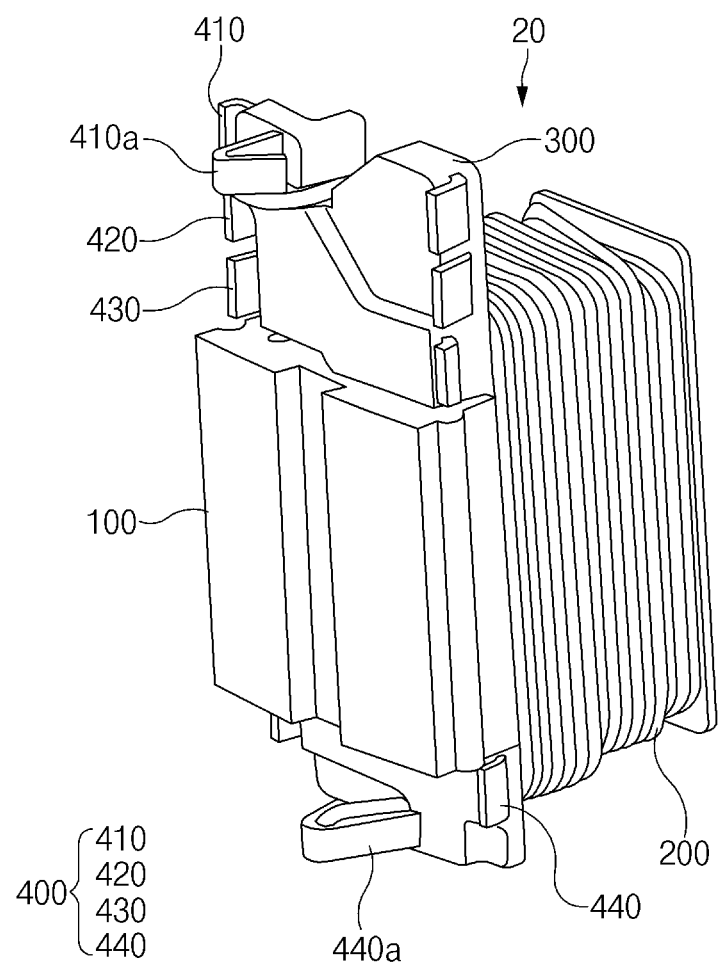
FIG. 4 is a perspective view illustrating a structure of an assembly that constitutes a stator of a motor for an automobile according to an exemplary embodiment.
Figure 5:
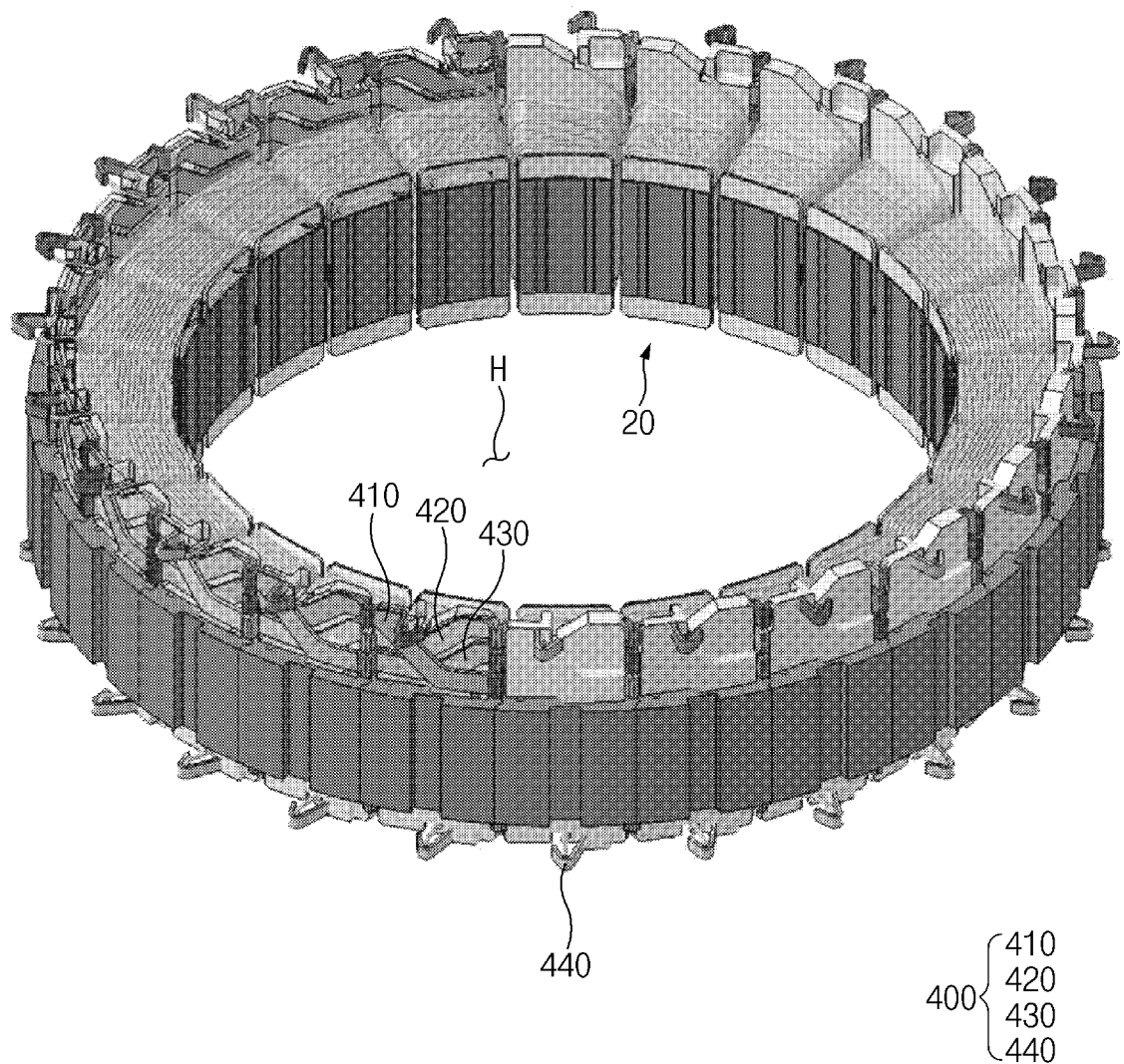
FIG. 5 illustrates a perspective view illustrating a structure of a stator of a motor for an automobile according to an exemplary embodiment.
Figure 6:
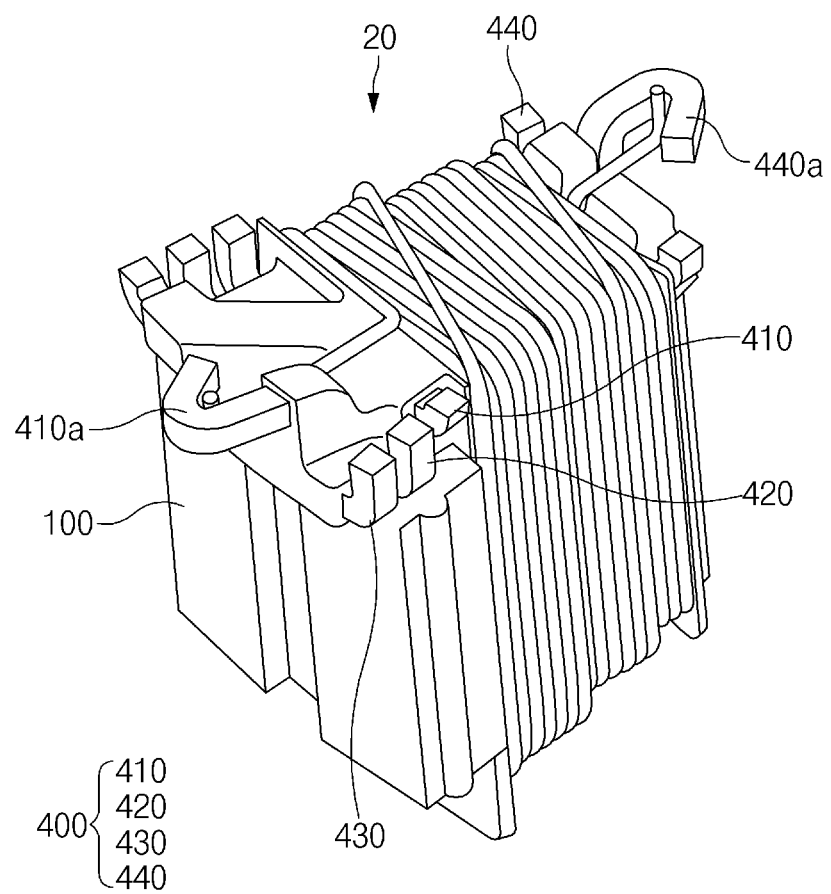
FIG. 6 is a perspective view illustrating a structure of an assembly that constitutes a stator of a motor for an automobile according to another exemplary embodiment.

FIG. 4 is a perspective view illustrating a structure of an assembly that constitutes a stator of a motor for an automobile according to an exemplary embodiment, and FIG. 5 illustrates a perspective view illustrating a structure of a stator of a motor for an automobile according to an exemplary embodiment. FIG. 6 is a perspective view illustrating a structure of an assembly that constitutes a stator of a motor for an automobile according to another exemplary embodiment, and FIG. 7 is a perspective view illustrating a structure of a stator of a motor for an automobile according to another exemplary embodiment.

Figure 7:
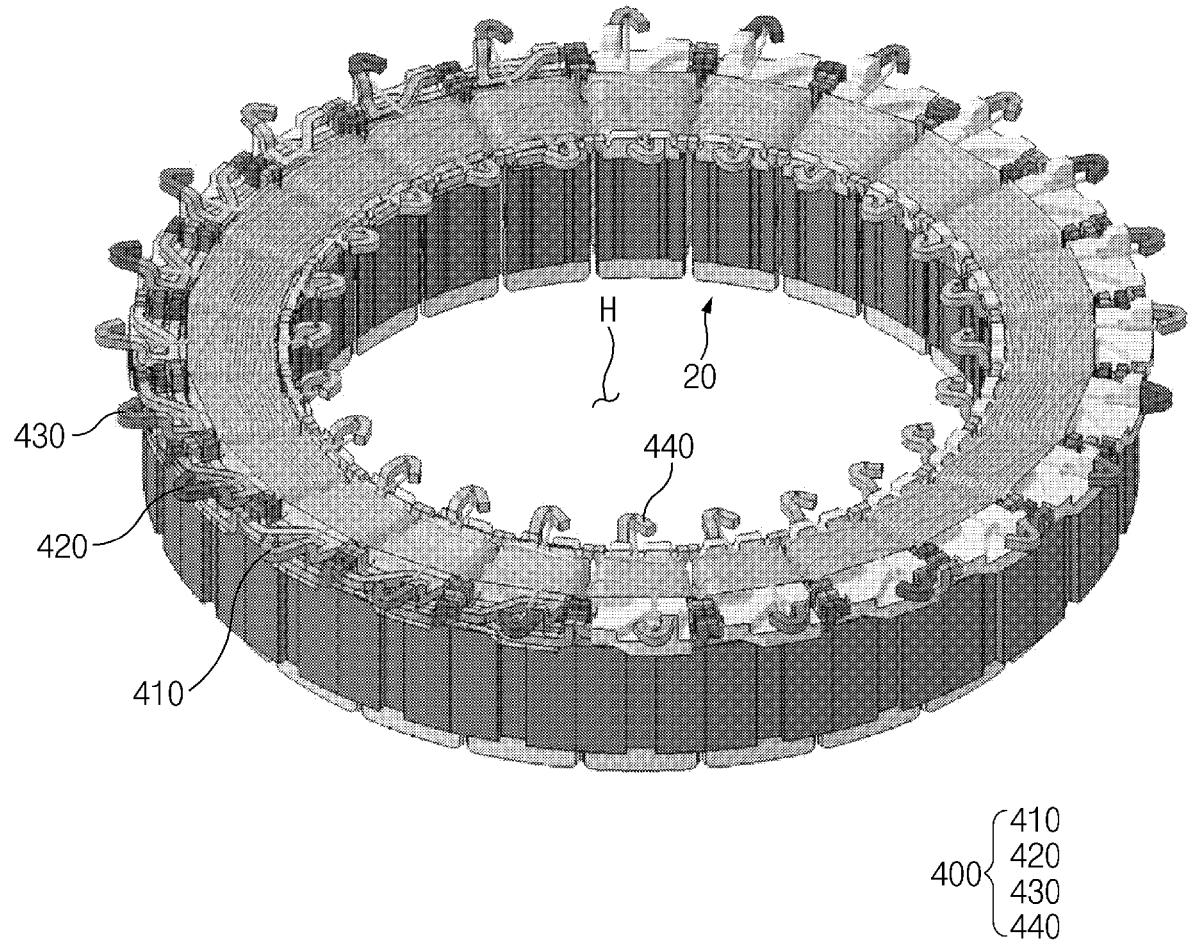
FIG. 7 is a perspective view illustrating a structure of a stator of a motor for an automobile according to another exemplary embodiment.

As illustrated in FIGS. 5, 6, and 7, a stator of a motor for an automobile according to an exemplary embodiment (hereinafter, referred to as a 'stator 10') may have a structure in which a plurality of assemblies 20 are arranged in a closed curve shape or a round shape to define a hole H at the center of the stator 10. Each of FIGS. 5 and 7 illustrates a state in which the plurality of assemblies 20 are arranged in an approximately circular shape to define the hole H. However, exemplary embodiments are not limited thereto. For example, the plurality of assemblies 20 may be arranged in a hollow cylindrical shape or an annular shape. Further, unlike the above configuration, the plurality of assemblies may be arranged in closed curves having various shapes such as a quadrangle and a triangle, and the holes may also be defined corresponding to the above various shapes.

For example, as illustrated in FIG. 1 and FIGS. 4 and 6, each of the plurality of assemblies 20 that constitute a stator 10 may include a stator core 100, a coil 200, and a bobbin 300. The bobbin 300 may be configured to surround the outer surface of the stator core 100. For example, the stator core 100 may have a structure inserted into an empty space defined in the bobbin 300.

The coil 200 may be configured to be wound multiple times around the outer surface of the bobbin 300, and lead-in lines 210a, 220a, and 230a and lead-out lines 210b, 220b, and 230b may be provided at both ends of the coil 200. For example, the lead-in lines 210a, 220a, and 230a and the lead-out lines 210b, 220b, and 230b may extend form the both ends of the coil 200 in the longitudinal direction of the bobbin 300, respectively. The lead-in lines 210a, 220a, and 230a and the lead-out lines 210b, 220b, and 230b may protrude outwardly from the stator core 100.

According to an exemplary embodiment, a magnetic field is formed around the coil 200 when current flows through the coil 200. Accordingly, induced electromotive force is generated in a rotor provided in a motor by a change in magnetic field, and thus, the rotor rotates. A driving principal of the motor including the rotor and stator is a well-known technical feature in the art, and thus, description thereof will be omitted for descriptive convenience.

The stator 10 according to an exemplary embodiment may further include a plurality of bus bars 400 disposed in the bobbin 300. As described later, the bus bar 400 may provide a path through which the assembly 20 constituting the stator 10 receives power from a power supply unit. To this end, one of the plurality of bus bars 400 provided in each of the assemblies 20 may be connected to the lead-in line 210a, 220a, or 230a. Also, another one of the plurality of bus bars 400 provided in each of the assemblies 20 may be connected to the lead-out line 210b, 220b, or 230b. For example, each of the lead-in lines 210a, 220a, and 230a may be bonded to one of the plurality of bus bars 400, and each of the lead-out lines 210b, 220b, and 230b may be bonded to another one of the plurality of bus bars 400. For example, the bonding between the lead-in lines 210a, 220a, and 230a, the lead-out lines 210b, 220b, and 230b, and the plurality of bus bars 400 may be made by welding.

Also, each of the plurality of assemblies 20 constituting the stator 10 according to an exemplary embodiment may have substantially the same structure. For example, the plurality of assemblies may have substantially the same structure. In other words, the plurality of assemblies may have the identity so as to be recognized as compatible components when a user glances relative positions of the stator cores, the coils, the bobbins, and the bus bars that constitute the plurality of assemblies.

Nevertheless, according to an exemplary embodiment, the plurality of assemblies 20 constituting the stator 10 may be divided into a plurality of groups. For example, the plurality of assemblies 20 may be divided into one or more first assemblies 20a, one or more second assemblies 20b, and one or more third assemblies 20c. However, exemplary embodiments are not limited thereto. For example, this is not intended to suggest that structures of the first, second, and third assemblies are different from each other. Further, according to an exemplary embodiment, the first, second, and third assemblies 20a, 20b, and 20c may have substantially the same structure. As described later, the first, second, and third assemblies 20a, 20b, and 20c may be divided according to phases of power received from the power supply unit.

Also, as illustrated in FIGS. 5 and 7, the stator 10 may have a structure in which each of the first assemblies 20a, each of the second assemblies 20b, and each of the third assemblies 20c are alternately arranged in a closed curve shape (e.g., a hollow cylindrical shape or an annular shape).

For example, the second assembly 20b and the third assembly 20c may be disposed on one side of the first assembly 20a and the other side thereof opposite to the one side, respectively. Further, the first assembly 20a and the third assembly 20c may be disposed on one side of the second assembly 20b and the other side thereof opposite to the one side, respectively. Further, the first assembly 20a and the second assembly 20b may be disposed on one side of the third assembly 20c and the other side thereof opposite to the one side, respectively. For example, the group of the first, second, and third assemblies 20a, 20b, and 20c are repeatedly arranged in the closed curved shape. Thus, the number of each of the first, second, and third assemblies 20a, 20b, and 20c provided in the stator 10 may be substantially the same as each other.

According to an exemplary embodiment, the first assembly 20a, the second assembly 20b, and the third assembly 20c may have identity or similarity so as to be compatible with each other. The criteria, for determining whether or not the first, second, and third assemblies 20a, 20b, and 20c have the identity or similarity so as to be compatible with each other, are determined by one of ordinary skill in the art. Thus, according to an exemplary embodiment, by manufacturing only an assembly having one standard without separately manufacturing first, second, and third assemblies 20a, 20b, and 20c constituting a stator in order to manufacture a motor for an automobile, the motor for an automobile including the stator with the first, second, and third assemblies 20a, 20b, and 20c may be manufactured. Thus, a process for manufacturing components may be simplified, and inventory may be easily managed.

Also, referring to FIGS. 1, 2, 4, and 6, some of the plurality of bus bars 400 provided in the assemblies 20 of the stator 10 according to an exemplary embodiment may intersect others of the plurality of bus bars 400.

More particularly, referring to FIGS. 1, 2, 3, 4 and 6, the plurality of bus bars 400 may include a first bus bar 410, a second bus bar 420, a third bus bar 430, and a fourth bus bar 440.

According to an exemplary embodiment, the first bus bar 410 may sequentially intersect the second bus bar 420 and the third bus bar 430. Also, the first bus bar 410 may not intersect the fourth bus bar 440, and the second, third, and fourth bus bars 420, 430, and 440 may not intersect each other. For example, the second bus bar 420 and the third bus bar 430 may be provided to parallel each other. For example, the second bus bar 420 and the third bus bar 430 may have substantially the same size and the same shape. Here, the lead-in lines 210a, 220a, and 230a provided at ends of the coils 200 of the first, second, and third assemblies 20a, 20b, and 20c may be bonded to the respective first bus bars 410 provided in the first, second, and third assemblies 20a, 20b, and 20c.

In an exemplary embodiment, a terminal for connecting a motor to a power supply unit is removed, and instead, the plurality of bus bars are provided. Thus, a volume occupied by the terminal may be reduced, and the weight and production costs of the terminal may be reduced.

According to an exemplary embodiment, some of the plurality of bus bars 400 provided in the assembly 20 have structures intersecting each other, and thus, a volume occupied by the plurality of bus bars serving as the terminal may be reduced as much as possible. Therefore, the volume and structure of the motor for an automobile including the stator according to the exemplary embodiment may be simplified.

According to an exemplary embodiment, the plurality of first assemblies 20a may be electrically connected to each other by the bus bars 400, the plurality of second assemblies 20b may be electrically connected to each other by the bus bars 400, and the plurality of third assemblies 20c may be electrically connected to each other by the bus bars 400.

To this end, according to the illustrated exemplary embodiment as illustrated in FIG. 1, one end of the first bus bar 410 of the first assembly 20a may be connected to one end of the second bus bar 420 of the neighboring second assembly 20b, and the other end of the first bus bar 410 of the first assembly 20a may be connected to one end of the third bus bar 430 of the neighboring third assembly 20c.

Also, one end of the second bus bar 420 of the first assembly 20a may be connected to one end of the third bus bar 430 of the neighboring second assembly 20b, and the other end of the second bus bar 420 of the first assembly 20a may be connected to one end of the first bus bar 410 of the neighboring third assembly 20c.

Also, one end of the third bus bar 430 of the first assembly 20a may be connected to one end of the first bus bar 410 of the neighboring second assembly 20b, and the other end of the third bus bar 430 of the first assembly 20a may be connected to one end of the second bus bar 420 of the neighboring third assembly 20c.

Also, referring to FIG. 1 again, the one end of the first bus bar 410 of the second assembly 20b may be connected to one end of the second bus bar 420 of the neighboring third assembly 20c, and the one end of the second bus bar 420 of the second assembly 20b may be connected to one end of the third bus bar 420 of the neighboring third assembly 20c. Also, the one end of the third bus bar 430 of the second assembly 20b may be connected to one end of the first bus bar 410 of the neighboring third assembly 20c.

In a case in which the first, second, and third bus bars 410, 420, and 430 provided in the first assemblies 20a, the first, second, and third bus bars 410, 420, and 430 provided in the second assemblies 20b, and the first, second, and third bus bars 410, 420, and 430 provided in the third assemblies 20c are connected to each other, respectively, in the manner described above, the first lead-in lines 210a which are lead-in lines provided in the coils 200 of the first assemblies 20a may be electrically connected to each other by the bus bars 400, and the second lead-in lines 220a which are lead-in lines provided in the coils 200 of the second assemblies 20b may be electrically connected to each other by the bus bars 400. Also, the third lead-in lines 230a which are lead-in lines provided in the coils 200 of the third assemblies 20c may be electrically connected to each other by the bus bars 400.

Also, referring to FIG. 1 again, the lead-out lines 210b, 220b, and 230b provided at the other ends of the coils 200 of the assemblies 20 may be bonded to the respective fourth bus bars 440.

More particularly, one end of the fourth bus bar 440 of the first assembly 20a may be connected to one end of the fourth bus bar 440 of the neighboring second assembly 20b, and the other end of the fourth bus bar 440 of the first assembly 20a may be connected to one end of the fourth bus bar 440 of the neighboring third assembly 20c. Also, the one end of the fourth bus bar 440 of the second assembly 20b may be connected to the one end of the fourth bus bar 440 of the neighboring third assembly 20c.

In a case in which the fourth bus bars 440 provided in the first assemblies 20a, the fourth bus bars 440 provided in the second assemblies 20b, and the fourth bus bars 440 provided in the third assemblies 20c are connected to each other in the manner described above, the second lead-out lines 210b which are lead-out lines provided in the coils 200 of the first assemblies 20a, the second lead-out lines 220b which are lead-out lines provided in the coils 200 of the second assemblies 20b, and the third lead-out lines 230b which are lead-out lines provided in the coils 200 of the third assemblies 20c may be connected to each other by the bus bars 400.

Also, as illustrated in FIG. 2, in the stator 10 according to an exemplary embodiment, the first bus bar 410 may include a hook portion 410a that has a hook shape protruding outwardly and bent inwardly. Here, the lead-in lines 210a, 220a, and 230a provided in the coils 200 of the first, second, and third assemblies 20a, 20b, and 20c may be bonded to the inner surfaces of the hook portions 410a of the first bus bars 410. In this case, the lead-in lines 210a, 220a, and 230a may be stably bonded to the first bus bar through a bent section defined by the shape of the hook portion, and the lead-in lines 210a, 220a, and 230a may be protected from an external shock.

Also, as illustrated in FIG. 3, in the stator 10 according to an exemplary embodiment, the fourth bus bar 440 may also include a hook portion 440a that has a hook shape protruding outwardly and bent inwardly. Here, the lead-out lines 210b, 220b, and 230b provided in the coils 200 of the first, second, and third assemblies 20a, 20b, and 20c may be bonded to the inner surfaces of the hook portions 440a of the fourth bus bars 440. In this case, the lead-out line may be stably bonded to the fourth bus bar through a bent section defined by the shape of the hook portion, and the lead-out line may be protected from an external shock.

Also, the stator 10 according to an exemplary embodiment may receive power from a power supply unit that supplies three-phase power of U-phase power, V-phase power, and W-phase power.

Here, the first assembly 20a may receive the U-phase power from the power supply unit via the first lead-in line 210a of the first assembly 20a, the second assembly 20b may receive the V-phase power from the power supply unit via the second lead-in line 220a of the second assembly 20b, and the third assembly 20c may receive the W-phase power from the power supply unit via the third lead-in line 230a of the third assembly 20c. For example, according to the illustrated exemplary embodiments as described above, by using the plurality of bus bars 400, the plurality of first assemblies 20a may be electrically connected to each other, the plurality of second assemblies 20b may be electrically connected to each other, and the plurality of third assemblies 20c may be electrically connected to each other. Thus, the first, second, and third assemblies 20a, 20b, and 20c may receive power having different phases via the first, second, and third lead-in lines 210a, 220a, and 230a, respectively.

Also, the first, second, and third assemblies 20a, 20b, and 20c are connected to a neutral line via the first, second, and third lead-out lines 210b, 220b, and 230b of the first, second, and third assemblies 20a, 20b, and 20c. Thus, all of the first, second, and third assemblies 20a, 20b, and 20c may be connected to the neutral line by the lead-out lines 210b, 220b, and 230b.

As illustrated in FIGS. 4 and 5, in the stator 10 according to an exemplary embodiment, a direction in which the first, second, and third bus bars 410, 420, and 430 are disposed may be parallel to a direction in which the bobbin 300 extends. Each of FIGS. 4 and 5 illustrates a state in which the first, second, and third bus bars 410, 420, and 430 are disposed on an upper portion of the outer surface of the bobbin 300 in a vertical direction (e.g., the longitudinal direction of the bobbin 300). In a case in which the first, second, and third bus bars 410, 420, and 430 are arranged according to the illustrated exemplary embodiment described above, the degree to which the first, second, and third bus bars 410, 420, and 430 protrude in a radial direction of the stator 10 may be reduced as much as possible.

Also, according to the illustrated exemplary embodiment, the fourth bus bar 440 as well as the first, second, and third bus bars 410, 420, and 430 may also be disposed on the outer surface of the bobbin 300. Each of FIGS. 4 and 5 illustrates a state in which the fourth bus bar 440 is provided on a lower portion of the outer surface of the bobbin 300. Thus, the stator core 100 is provided between the fourth bus bar 440 and the first, second, and third bus bars 410, 420, and 430.

Also, as illustrated in FIGS. 6 and 7, in the stator 10 according to another exemplary embodiment, a direction in which the first, second, and third bus bars 410, 420, and 430 are disposed may be perpendicular to the direction in which the bobbin 300 extends. According to another exemplary embodiment, each of FIGS. 6 and 7 illustrates a state in which the first, second, and third bus bars 410, 420, and 430 are disposed on an upper portion of the outer surface of the bobbin 300 in a radial direction of the stator 10. In a case in which the first, second, and third bus bars 410, 420, and 430 are arranged according to the exemplary embodiment described above, the degree to which the first, second, and third bus bars 410, 420, and 430 protrude in an axial direction of the stator 10 may be reduced as much as possible.

Also, according to the illustrated exemplary embodiment, the first, second, and third bus bars 410, 420, and 430 may be disposed on the outer surface of the bobbin 300, and the fourth bus bar 440 may be disposed on the inner surface of the bobbin 300. According to another exemplary embodiment, each of FIGS. 6 and 7 illustrates a state in which the first, second, and third bus bars 410, 420, and 430 are provided on the upper portion of the outer surface of the bobbin 300, and the fourth bus bar 440 is provided on the upper portion of the inner surface of the bobbin 300. Thus, the coil 200 is provided between the fourth bus bar 440 and the first, second, and third bus bars 410, 420, and 430.

According to the illustrated exemplary embodiments, the weight and production costs of the driving motor for an automobile may be reduced by removing an existing terminal, the space utilization around the motor may be increased, and the structure of the motor may be simplified.

Although the present disclosure is described by specific embodiments and drawings as described above, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A stator of a motor for an automobile, the stator comprising:
    a plurality of assemblies disposed in a curved shape to form a hole at a center of the stator,
    wherein each of the plurality of assemblies comprises:
    a stator core;
    a bobbin surrounding an outer surface of the stator core;
    a coil being wound multiple times around the bobbin and connected to a lead-in line and a lead-out line disposed at both ends of the coil, respectively; and
    a plurality of bus bars disposed on the bobbin, wherein:
    at least one of the plurality of bus bars is connected to the lead-in line or the lead-out line, and
    at least two of the plurality of bus bars intersect each other.

2. The stator of claim 1, wherein the plurality of bus bars comprise a first bus bar, a second bus bar, and a third bus bar, and
    the first bus bar intersects the second bus bar and the third bus bar.

3. The stator of claim 2, wherein the lead-in line is bonded to the first bus bar.

4. The stator of claim 2, wherein the second bus bar and the third bus bar are disposed to parallel each other.

5. The stator of claim 2, wherein the plurality of assemblies are divided into one or more first assemblies, one or more second assemblies, and one or more third assemblies, and
    each of the first assemblies, each of the second assemblies, and each of the third assemblies are alternately disposed in the curve shape,
    wherein one end of the first bus bar of each first assembly is connected to one end of the third bus bar of each second assembly, and the other end of the first bus bar of each first assembly is connected to one end of the second bus bar of each third assembly,
    one end of the second bus bar of each first assembly is connected to one end of the first bus bar of each second assembly, and the other end of the second bus bar of each first assembly is connected to one end of the third bus bar of each third assembly, and
    one end of the third bus bar of each first assembly is connected to one end of the second bus bar of each second assembly, and the other end of the third bus bar of each first assembly is connected to one end of the first bus bar of each third assembly.

6. The stator of claim 5, wherein:
    the one end of the first bus bar of each second assembly is connected to one end of the third bus bar of each third assembly,
    the one end of the second bus bar of each second assembly is connected to one end of the first bus bar of each third assembly, and
    the one end of the third bus bar of each second assembly is connected to one end of the second bus bar of each third assembly.

7. The stator of claim 6, wherein the stator receives power from a power supply unit configured to supply three-phase power of U-phase power, V-phase power, and W-phase power, and wherein:
    each first assembly receives the U-phase power from the power supply unit via the lead-in line of each first assembly,
    each second assembly receives the V-phase power from the power supply unit via the lead-in line of each second assembly, and
    each third assembly receives the W-phase power from the power supply unit via the lead-in line of each third assembly.

8. The stator of claim 2, wherein:
    the plurality of bus bars further comprise a fourth bus bar, and
    the lead-out line is bonded to the fourth bus bar.

9. The stator of claim 6, wherein the first, second, and third assemblies are connected to a neutral line via the lead-out lines of the first, second, and third assemblies.

10. The stator of claim 8, wherein a direction, in which the first, second, and third bus bars are disposed, parallels a direction in which the bobbin extends.

11. The stator of claim 8, wherein a direction, in which the first, second, and third bus bars are disposed, is perpendicular to a direction in which the bobbin extends.

12. The stator of claim 10, wherein the first, second, third and fourth bus bars are disposed on an outer surface of the bobbin.

13. The stator of claim 11, wherein:
the first, second, and third bus bars are disposed on an outer surface of the bobbin, and
the fourth bus bar is disposed on an inner surface of the bobbin opposite to the outer surface of the bobbin.

14. The stator of claim 8, wherein one end of the fourth bus bar of each first assembly is connected to one end of the fourth bus bar of each second assembly, and
the other end of the fourth bus bar of each first assembly is connected to one end of the fourth bus bar of each third assembly,
wherein the one end of the fourth bus bar of each second assembly is connected to the one end of the fourth bus bar of each third assembly.

15. The stator of claim 3, wherein:
the first bus bar comprises a hook portion having a hook shape protruding outwardly and bent inwardly, and
the lead-in line is bonded to an inner surface of the hook portion of the first bus bar.

16. The stator of claim 8, wherein:
the fourth bus bar comprises a hook portion having a hook shape protruding outwardly and bent inwardly, and
the lead-out line is bonded to an inner surface of the hook portion of the fourth bus bar.

17. The stator of claim 5, wherein each first assembly, each second assembly, and each third assembly have identity or similarity so as to be compatible with each other.

* * * * *